United States Patent [19]
Sharples

[11] 3,767,881
[45] Oct. 23, 1973

[54] RESILIENT SWITCH BEARING
[75] Inventor: Thomas D. Sharples, Atherton, Calif.
[73] Assignee: Beckman Instruments, Inc., Fullerton, Calif.
[22] Filed: Mar. 6, 1972
[21] Appl. No.: 232,011

[52] U.S. Cl.......................... 200/172 A, 200/153 T
[51] Int. Cl. ............................................. H01h 3/04
[58] Field of Search ................... 200/172 R, 172 A, 200/153 T, 153 W; 308/2 R, 2 A

[56] References Cited
UNITED STATES PATENTS

| | | | |
|---|---|---|---|
| 3,700,843 | 10/1972 | Resh | 200/172 A |
| 3,681,554 | 8/1972 | Arthur | 200/172 A |
| 3,571,541 | 3/1971 | Bedocs | 200/172 A |
| 3,484,572 | 12/1969 | Froyd | 200/153 T |
| 2,898,428 | 8/1959 | Holden | 200/172 A |
| 2,743,331 | 4/1956 | Lauder et al. | 200/172 A |

Primary Examiner—Robert K. Schaefer
Assistant Examiner—William J. Smith
Attorney—James M. Thomson et al.

[57] ABSTRACT

A switch having an operating lever provided with support ears pivotably retained in pivot-bearing holes formed in bearing projections on the switch case. An elastomeric filling is provided between each support ear and its corresponding bearing hole whereby torsional pivot bearings are provided for the operating lever. In one embodiment the elastomeric filling is bonded to the support ears and to the inner surfaces of the bearing holes. The elastomeric filling can comprise any suitable elastomer such as RTV silicone or urethane based rubber.

7 Claims, 4 Drawing Figures

PATENTED OCT 23 1973 3,767,881

RESILIENT SWITCH BEARING

BACKGROUND OF THE INVENTION

The present invention relates to a switch having an operating arm supported upon the switch case by an elastomeric bearing. More particularly the invention concerns a switch, such as a snap-action switch, having an operating lever provided with support ears that are pivotally retained in pivot-bearing holes formed in bearing projections on the switch case by elastomeric fillings.

Various snap-action switches are known in the prior art, one common type of which includes an operating lever adapted to pivot about a pivot bearing for exerting operating force upon the plunger of an internal switch mechanism. U.S. Pat. Nos. 3,336,458 and 3,484,572 are exemplary of switches of this type. A similar type of switch includes an operating lever having support ears formed thereon, with the support ears being pivotably retained in pivot-bearing holes formed in bearing projections extending from the switch case. A wear problem commonly occurs in such switches after a relatively small number of cycles of operation due to erosion of the material, usually plastic, from which the bearing projections are fabricated. The erosion occurs in the surfaces of the pivot-bearing holes in the bearing projections and is caused by repetitive contact between the support ears on the operating level, which are usually formed of metal, and the pivot-bearing holes. The wear problem, which occurs with low force switches, and is particularly acute in high force switches, results in a change in the operating point of the switches.

Lubrication of the pivot surfaces is not a satisfactory solution to the problem as this merely aids the cutting action of the metal ears on the molded plastic. Furthermore the use of low force switches in certain situations is not feasible, since they characteristically have high contact bounce. Furthermore, the use of low force switches of this type is only practical where lower switching capacity is required.

Accordingly a need has existed in the prior art for a high force switch having low wear characteristics and a constant operating point, which switch is capable of reliable operation through the relatively high number of cycles of operation, without service or replacement.

SUMMARY OF THE INVENTION

Accordingly it is an object of the invention to provide an improved switch having a relatively long operating life.

It is another object of the invention to provide a switch having an operating lever which is pivotably supported upon the switch case by a resilient bearing having low operating point shift over the life of the switch.

It is yet another object of the invention to provide a relatively high force switch having a torsionally mounted operating lever that enables low wear switch operation.

These and other objects and features of the invention are attained in a switch having an operating lever provided with support ears pivotably retained in pivot-bearing holes formed in bearing projections on the switch case. An elastomeric filling is provided between each support ear and its corresponding bearing hole whereby torsional pivot bearings are formed between the operating lever and the switch case. In one embodiment the elastomeric filling is bonded to the support ears and to the inner surfaces of the bearing holes, and in another embodiment the elastomeric filling is bonded only to the surfaces of the bearing holes.

BRIEF DESCRIPTION OF THE DRAWINGS

Other features and advantages of the invention are apparent from the following detailed description taken in conjunction with the accompanying drawings wherein.

DETAILED DESCRIPTION OF THE INVENTION

Figure 1:
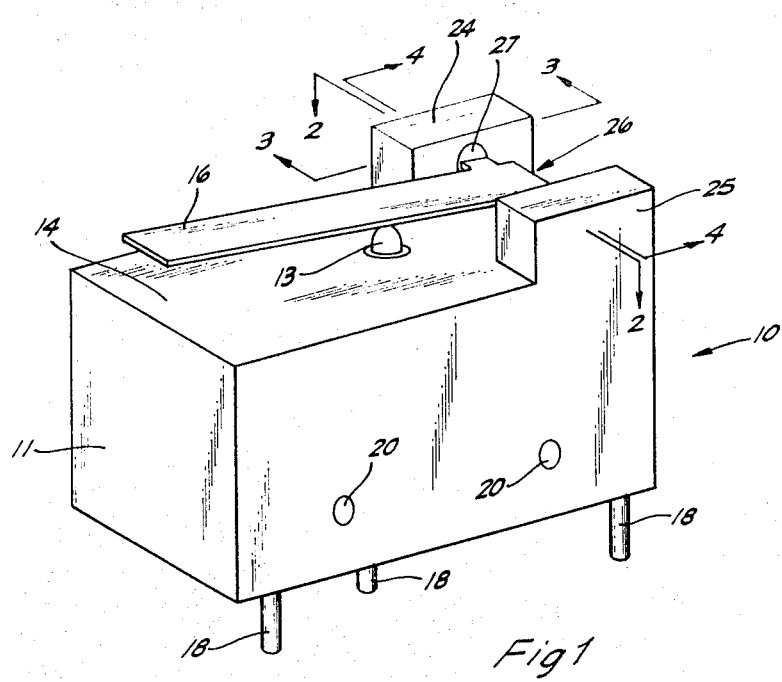
FIG. 1 is a perspective view of one preferred embodiment of the invention.

Referring now to the drawings a switch assembly 10 is generally indicated including a switch housing 11 having a plunger 13 extending through the upper surface 14 thereof. Plunger 13 is adapted to cooperate with a switch operating arm 16 in conventional fashion. In the embodiment illustrated it is envisioned that plunger 13 operate a conventional switch mechanism, not illustrated, confined within housing 11. The switch mechanism can be of snap action design, whereby successive operations of the operating lever and plunger would turn the switch on and off, respectively. Alternatively, plunger 13 could be spring biased to an upwardly extended position whereby the switch mechanism is normally off. In that event, downward force on the operating lever or arm of sufficient magnitude to overcome the plunger bias would turn the switch mechanism on. In either case the operation of lever 16 about a pivot point is the same, as will be explained in detail hereinafter. Switch housing 11 otherwise supports electrical contacts 18 of conventional design adapted to connect the switch mechanism with suitable external circuitry. Housing 11 also is formed with one or more openings 20 therethrough which serve as mounting holes for the switch assembly.

The upper surface 14 of the housing is formed with integral upstanding bearing projections 24, 25 at one end thereof. The bearing projections are of generally cubicle shape and are separated by a channel or opening 26. The inner surface or side of each projection is provided with an opening or hole 27, 28 which serve as pivot-bearing holes. In the embodiment illustrated projections 24, 25 each have a thickness approximately equal to one third of the width of the switch housing and separation channel 26 has approximately that same width. Holes 27, 28 are of circular cross section and extend to a depth of about two thirds the width of the projection. It should be apparent that openings of other configuration could be utilized.

The upper surface of the switch housing is preferably formed of plastic, such as a phenolic plastic, which can be molded or otherwise fabricated into the desired shape by conventional techniques. Switches of this type are normally fabricated of plastic for economic reasons also. However, other materials could be utilized, if desired. The upper surface 14 can comprise an integral portion of the housing as illustrated in the embodiment shown or it can comprise a removable cap for the housing.

Figure 3:
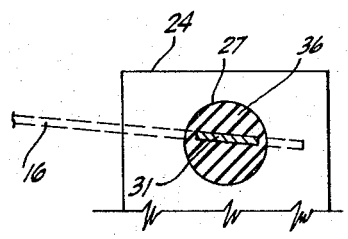
FIG. 3 is a fragmentary view, in section, taken along lines 3—3 in FIG. 1.
Figure 2:
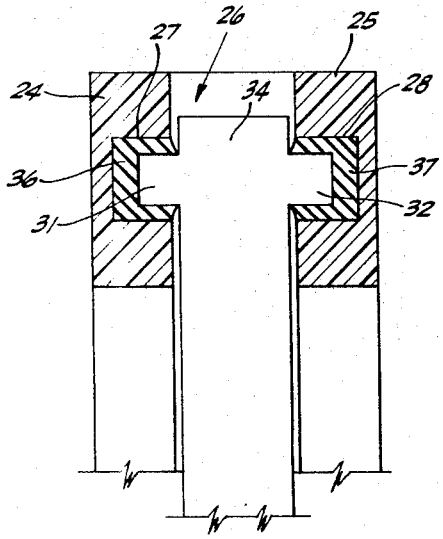
FIG. 2 is a top view, in section, taken along lines 2—2 in FIG. 1.
Figure 4:
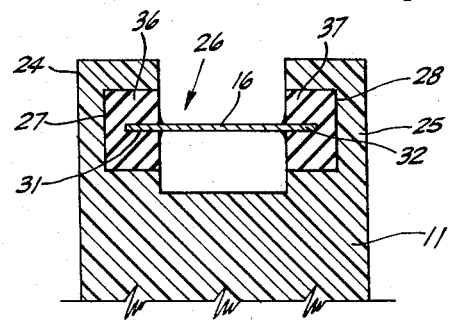
FIG. 4 is a fragmentary end view, in section, taken along lines 4—4 in FIG. 1.

Referring now to FIGS. 2-4, operating lever 16 is particularly illustrated as comprising an elongate metallic bar having a pair of laterally projecting portions or ears 31, 32 which extend from opposite sides of one end thereof and provide the support pivots therefor. The operating lever is also provided with a tail portion 34, as best seen in FIG. 2, for engaging the surface of the switch housing 11 to limit the upper pivot position of the operating lever away from the switch case. Support ears 31, 32 are of rectangular configuration and have a length which approximates two thirds the depth of openings 27, 28 into which the support ears extend. The overall width of operating arm 16 is less than the width of channel 26 in which the operating arm is generally seated so that ample operating tolerance is provided therebetween.

The support ears are pivotably secured within the pivotbearing holes by elastomeric fillings or inserts 36, 37. In the embodiment illustrated the fillings overflow the holes although this is not essential. Inserts 36, 37 are preferably comprised of an elastomeric material, such as RTV silicone or a suitable urethane rubber material. Preferably the inserts are bonded both to the inner surfaces of openings 27, 28 and to the surfaces of support ears 31 32. The silicone and urethane elastomers have been found to be highly suitable for this purpose since they can be bonded to the plastic surfaces of openings 27, 28 and to the metallic surfaces of support ears 31, 32. Also the elastomeric materials have satisfactory mechanical fatigue resistance and low damping factors which enable them to perform as torsion bearing members upon the successive pivoting of operating lever 16 with respect to the switch case.

Referring particularly to FIGS. 3 and 4 the support ears are illustrated having a relatively thin cross-sectional shape. Furthermore the width of ear 31 is shown to be slightly less than the diameter of opening 27, and the lower surface of support ear 31 is supported within opening 27 at approximately the center of the circular opening. Accordingly with filling 36 surrounding the support ear a suitable flexibility of operating lever 16 is possible without exerting undue stress upon any portion of filling 36. Likewise, since the support ears extend significantly into openings 27, 28 the operating lever is solidly supported with respect to the switch and is susceptible of accurate repetitive movement along a well defined vertical axis.

It is possible to achieve satisfactory operation of the switch where the elastomeric material is bonded only to the surfaces of the pivot bearing holes. Also, it is conceivable that a molded rubber insert could be mechanically fitted between the operating lever and the pivot-bearing holes, without bonding although such is not preferred. It should also be apparent that the elastomeric inserts could be fitted within appropriate holes or cavities of other design and that the support ears of the operating lever could be formed of other configurations without departing from the invention.

In operation, the switch assembly described has been found to provide a high force switch wherein wear or the pivot joint is not a significant problem since the pivoting movement of the operating lever is absorbed by the resiliency of the elastomeric material, which has been found to be of good mechanical fatigue life. Consequently the switch has a relatively constant operating point even after continuous rapid actuation through an unusually high number of cycles. The switch is otherwise advantageous in that it is easy and inexpensive to fabricate and does not require high maintenance. Furthermore the necessity of lubricating a pivot mechanism is eliminated.

I claim:

1. A switch assembly comprising
   an elongate operating lever having a main body adapted for engagement with a switch plunger and a pair of support ears extending outwardly from opposite sides of the main body near one end thereof,
   a switch housing including a pair of spaced-apart upstanding bearing projections each having an opening formed therein to accept a support ear of said operating lever, and
   an elastomeric filling secured in each said opening surrounding said support ear to form a resilient, torsion bearing for said operating lever.

2. The switch actuating assembly of claim 1 wherein each of said openings is of circular cross section, each of said support ears is of rectangular cross section and has a width slightly less than the diameter of said opening, and wherein said elastomeric fillings fill the entire depth of said openings.

3. The switch actuating assembly of claim 2 wherein said elastomeric fillings are bonded to the inner surfaces of said openings.

4. The switch actuating assembly of claim 3 wherein said elastomeric fillings are bonded to the surfaces of said support ears.

5. The switch actuating assembly of claim 4 wherein said elastomeric fillings are formed of RTV silicone material.

6. The switch actuating assembly of claim 4 wherein said elastomeric fillings are formed of urethane-based rubber.

7. A switch assembly comprising an elongate operating lever having a main body adapted for engagement with a switch plunger and support means extending outwardly from one end of said main body,
   a switch housing including bearing projection means thereon with an opening formed therein to accept the support means of said operating lever, and
   an elastomeric filling secured in said opening to form a resilient torsion bearing for said operating lever.

* * * * *